United States Patent [19]

Blanchard et al.

[11] Patent Number: 5,143,740
[45] Date of Patent: Sep. 1, 1992

[54] PROCESS FOR PREPARING CEREAL FLAKES

[75] Inventors: Claude Blanchard, Corsier s/Vevey; Alfred Morand, Blonay; Robert H. Schmidt, Semsales, all of Switzerland

[73] Assignee: Nestec S.A., Vevey, Switzerland

[21] Appl. No.: 719,652

[22] Filed: Jun. 21, 1991

Related U.S. Application Data

[63] Continuation of Ser. No. 614,927, Nov. 16, 1990, abandoned.

[30] Foreign Application Priority Data

Dec. 2, 1989 [EP] European Pat. Off. ........ 89122258.0

[51] Int. Cl.⁵ ............................ A23L 1/00; A23P 1/00
[52] U.S. Cl. ..................................... 426/446; 426/448; 426/457; 426/621
[58] Field of Search ............... 426/446, 448, 457, 466, 426/503, 621; 99/353, 357; 425/369, 394, 296, 303, 307, 308

[56] References Cited

U.S. PATENT DOCUMENTS

| | | | |
|---|---|---|---|
| 2,997,968 | 8/1961 | Fitzpatrick et al. | 366/88 |
| 3,332,781 | 7/1967 | Benson et al. | 426/446 |
| 3,732,109 | 5/1973 | Poat et al. | 426/458 |
| 4,060,645 | 11/1977 | Risler et al. | 426/445 |
| 4,259,359 | 3/1981 | Spicer | 426/446 |
| 4,438,146 | 3/1984 | Colby et al. | 426/448 |
| 4,873,110 | 10/1989 | Short et al. | 426/621 |

FOREIGN PATENT DOCUMENTS 559326  6/1958  Canada ................. 426/621

Primary Examiner—George Yeung
Attorney, Agent, or Firm—Vogt & O'Donnell

[57] ABSTRACT

Cereal flakes are prepared from an extrusion-cooked dough which is extruded through a rectangularly shaped orifice to obtain an expanded and puffed extruded dough which then is stretched to obtain a dough density of from 75 g/liter to 200 g/liter. The stretched dough is cut into flakes which then are roasted.

18 Claims, 2 Drawing Sheets

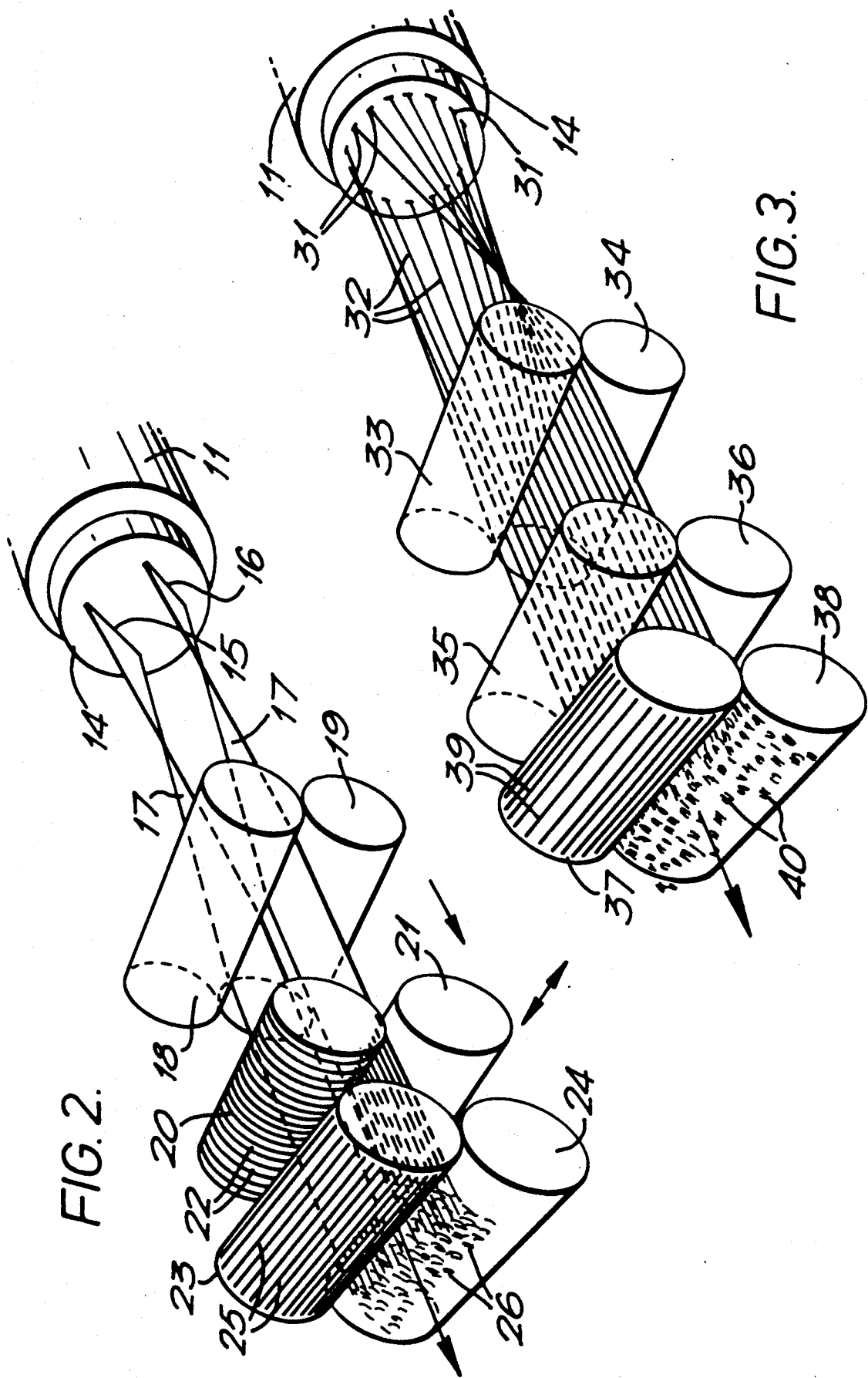

PROCESS FOR PREPARING CEREAL FLAKES

This application is a continuation of application Ser. No. 614,927, filed on Nov. 16, 1990, now abandoned.

BACKGROUND OF THE INVENTION

The present invention relates to a process and apparatus for the preparation of cereal flakes.

The traditional manufacture of cereal flakes by extrusion comprises the following steps:

1) The mixture of cereal flours and other ingredients is introduced in the extruder-cooker. Under the combined effect of the temperature and pressure, the mixture becomes thermoplastic.
2) The mixture is extruded through circular orifices where the dough undergoes an expansion caused by the sudden pressure drop and consequent vapourisation of the water, and a rotary knife cuts the dough into spherical grains about the size of a small pea. At this stage, the grains contain about 16% moisture.
3) The grains are transported to two grinding rollers which flatten the grains to their well-known flake shape.
4) The flakes may then optionally be sprinkled with an appropriate solution (flavours, sugars, salt, oil, water, gums, etc.) before roasting in an oven, e.g., gas, electric, in which the temperature diminishes progressively. The residual moisture content is from 1–3%.

SUMMARY OF THE INVENTION

We have devised a different method where the mixture of cereal flours is extruded through a rectangular shaped orifice contained in an extruder exit nozzle to give a strand which method involves control of density by stretching and provides two important advantages:

a) Stretching controls the density and preserves the flaky layered, crumbly texture of the strand. If a similar density is obtained by flaking, the texture becomes too hard and abrasive.
b) The moisture content of the flakes immediately after formation is about half that of the traditional method and the drying can therefore be carried out in a reduced time.

Accordingly, the present invention provides a process for the preparation of cereal flakes which comprises extruding a dough at an elevated temperature from an extruder-cooker through a thin flat, slit-like orifice to form an expanded and puffed strand which is stretched until the density is from 75 to 200 g/liter and then cut into individual flakes which then are roasted.

DETAILED DESCRIPTION OF THE INVENTION

The process of the invention is applicable to any kind of dough suitable for expansion by extrusion cooking either for sweet or for savoury products. The ingredients of the dough may be premixed, for example, in a screw-mixer, and the premix then is introduced into a hopper. The dough premix may be fed into the extruder-cooker at a flow rate, e.g., from 10 to 100 kg/hr., which is controllable, for instance, by means of a screw at the base of the hopper. Water can be added to the mixture usually in an amount of less than 5% by weight either in the hopper or in the extruder-cooker and, if desired, materials such as vegetable oil or a sugar syrup may be added at the opening of the extruder-cooker to modify the degree of expansion. Advantageously, steam may be injected instead of, or partly in place of, the water. This boosting with steam aids the cooking, builds up the pressure and can increase the capacity by up to 50%.

The dough becomes thermoplastic in the extruder-cooker and is extruded through at least one rectangularly shaped orifice contained in an extruder exit nozzle. There may be several orifices, e.g., from 2 to 20 and each orifice may conveniently have a width of from 0.1 to 1 mm and a length of from 5 mm up to the breadth of the extruder, e.g., exit nozzle, from 80 to 100 mm. Generally, the width of the orifice is from 0.25 to 0.75 mm. The length of the orifice depends on the desired width of the strand. For instance, a length of from 10 to 20 mm is suitable when the strand is to be cut only transversely to form the flakes. However, if desired, the length may be up to 100 mm whereupon the strands are cut, preferably by punching or stamping, both longitudinally and transversely to form the flakes. The speed of the strands of dough leaving the extrusion nozzle is usually from about 10 to 25 meters per minute.

After extrusion, the expanded and puffed strand of dough is stretched to reduce the expansion to achieve the desired density of the flakes, which is preferably from 80 to 160 g/liter and especially from 100 to 125 g/liter before being cut.

The stretching of the expanded and puffed strand of dough leaving the extruder is carried out by increasing the speed of the strand, usually from about 1.25 to 2 fold and is preferably carried out with a minimum of compression.

Generally, after extrusion, the expanded and puffed strand of dough is transferred to any kind of means which serves to support the strand and prevents it falling under its own weight, such as a conveyor belt or adjustable rollers, etc. Usually, the distance from the extruder orifice and the cutter is from 1 to 3 meters and preferably from 1.5 to 2.5 meters. Rollers are preferred to a conveyor belt as a supporting means because they can be more readily cleaned and cooled to prevent sticking of the hot extruded strand to the supporting means.

When a conveyor belt is used to support the strand, it is possible that, by choosing the appropriate speed, the conveyor belt may stretch the strand to the appropriate density. However, the stretching is preferably carried out by the cutting means or by introducing the expanded and puffed strand of dough between the nip of a pair of stretching rollers rotating at a speed which will increase the speed of the strand to a speed greater than that at which the dough is extruded to exert a traction on the dough. The gap between the rollers should be small enough to enable the dough to be stretched but not so small that substantial compression of the dough takes place. It is also feasible that some stretching may be carried out by the conveyor belt and some by the pair of stretching rollers. Typically, the strands are transported from the extruder to the cutting means at a speed of from 15 to 50, preferably from 20 to 40 and especially from 25 to 35 meters per minute.

The cutting is carried out when the desired flaky crumbly texture is achieved and various cutting means may be employed. For instance, it is possible for the pair of stretching rollers to carry out the cutting by the provision of cogs or cutting edges. It is also possible for one cogged roller positioned above a conveyor belt to stretch and cut the dough, in which case it is necessary to determine the appropriate distance of the cogged roller from the extrusion nozzle and/or the appropriate temperature of the strand to ensure the right degree of brittleness. However, advantageously, the strands of dough pass through the nip of a pair of cutting rollers at least one of which is provided with cogs. Since a small degree of compression of the strands does occur as they pass between the stretching rollers, advantageously the speed of the cutting rollers is about 10% higher than that of the stretching rollers to compensate for the elongation produced by this compression.

Extruded strands which have a width equal to that of the final flakes only need to be cut transversely while strands that are wider than the normal width of a cereal flake may be cut both in a longitudinal and a transverse direction to the desired size, e.g., by two pairs of cutting rollers which punch or stamp the strands longitudinally and transversely consecutively, or by a single cutting means with the appropriate cutting profile, for instance, a pair of cooperating rollers the surface of one of which is alveolar, to produce flakes of the desired shape and size.

Since the hot extruded strand can heat up the cutting rollers, it is important to provide cooling means to keep the temperature of the rollers below 60° to prevent sticking of the flakes to the rollers.

The pressure required to cut a strand is usually from 50 to 150 kg/cm. The moisture content of the flakes at the cutting stage is usually from 5 to 10%, preferably from 6 to 9% by weight.

The cut flakes may then be roasted to a moisture content of from 1 to 4%, preferably from 2 to 3% by weight.

Conveniently, the roasting is carried out by any conventional means, for example, in an electric, gas or jet-zone oven with an oven temperature from 120° C. to 170° C. for from 5 to 7 minutes. Afterwards, the flakes may be cooled, for instance in a fluidised bed.

The thickness of the cereal flakes is usually from 0.5 to 2.5 mm, more usually from 1 to 2 mm.

The present invention also provides an apparatus for the preparation of cereal flakes which comprises an extruder-cooker having an extrusion exit nozzle having at least one rectangularly shaped orifice, means for stretching strands of dough extruded from the extruder-cooker, a cutting means to cut the stretched strands into flakes and a means for roasting the flakes.

The stretching means should be capable of achieving a density of from 75 to 200 g/liter usually by increasing the speed of the strand leaving the extruder by from about 1.25 to 2- fold. The stretching means may be a pair of stretching rollers positioned downstream of the orifice of the extruder-cooker adapted to allow the strands to pass through the nip and adapted to rotate at a speed sufficient to stretch the strands appropriately.

There may also be provided means which serves to support the strands of dough extruded from the extrusion cooker, for instance, a conveyor belt or one or more adjustable rollers.

The cutting means may be a pair of cutting rollers adapted to allow the stretched strands of dough to pass through the nip and to cut the stretched strands by means of cogs or cutting edges on at least one of the pair of cutting rollers.

When the extruded strands have a width equal to that of the final flake, the cutting means is adapted to cut them transversely to the desired length of the final flake. However, when the extruded strands have a width greater than that of the final flake, a separate cutting means may cut the strands longitudinally. Advantageously, a single cutting means with the appropriate cutting profile may be provided to cut the strands both longitudinally and transversely, e.g., by punching or stamping, to produce flakes of the desired shape, e.g., a pair of cooperating rollers one of which is provided with alveoli having cutting edges of the required shape. In addition, when the extruded strands have a width greater than that of the final flake it is also possible that the cutting means alone may serve to stretch the strands rendering the use of stretching rollers unnecessary. In this case, the cutting means advantageously comprises a pair of cooperating cutting rollers one of which is provided with alveoli having cutting edges of the required shape but which are offset by means of the cutting edges adapted to cut the strands transversely being offset relative to similar cutting edges of laterally adjacent alveoli. This ensures that the whole width of a strand is not cut transversely at any one time, in which case a part of the strand is being stretched while another part is being cut transversely.

There may also be provided cooling means to keep the temperature of the cutting rollers below 60° C. to prevent the flakes sticking to the rollers. Such cooling means may be, for instance provided by cold water. As a precautionary measure in case any flakes stick to the rollers, there is provided a means for removing such flakes from the rollers, e.g., a jet of air trained in a tangential direction on to the surface of the rollers or a brush or scraper or an air blowing device, e.g., by means of nozzles.

The means for roasting the flakes may be conventional, for example an electric, gas or jet-zone oven.

The invention is further illustrated by means of the accompanying drawings.

BRIEF DESCRIPTION OF THE DRAWINGS

FIG. 2 represents a perspective view of part of the apparatus shown in FIG. 1, FIG. 3 represents a perspective view of part of an apparatus where sixteen strands are extruded.

DETAILED DESCRIPTION OF THE DRAWINGS

Figure 1:
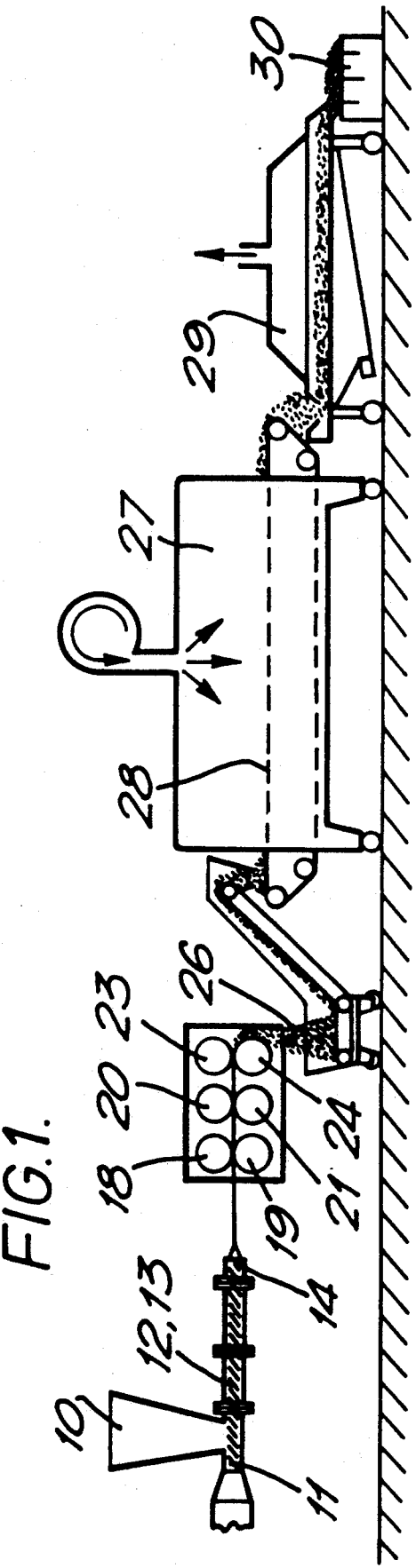
FIG. 1 represents a diagrammatic side view of a suitable apparatus where two strands are extruded.

Referring to FIGS. 1 and 2 of the drawings, the apparatus comprises a hopper (10), an extruder-cooker (11) with two screws (12,13), an exit nozzle (14) provided with two rectangularly shaped orifices (15,16) each having dimensions of 0.5 mm×90 mm for extruding strands of dough (17), a pair of stretching rollers (18,19), a first pair of cutting rollers (20,21) situated 2 meters from the orifices (15,16) provided with grooves (22) whose edges are adapted to cut each strand longitudinally into six strands, each of 15 mm breadth. A pair of cutting rollers (23,24) roller (23) are provided with cogs (25) for cutting each strand transversely into flakes (26) each flake having a length of about 15 mm and a breadth of about 15 mm, an electric oven (27) through which runs conveyor belt (28), a fluidised bed (29) and a collecting container (30).

In FIG. 3, the extruder-cooker (11) has an exit nozzle (14) provided with sixteen rectangularly shaped orifices

(31) arranged in a circle each having dimensions of 0.5 mm × 15 mm for extruding strands of dough (32), a pair of stretching rollers (33,34), a pair of synchronising rollers (35,36) and a pair of cutting rollers (37,38), roller (37) being provided with cogs (39) for cutting each strand into flakes (40) each about 15 mm in length.

Figure 4:
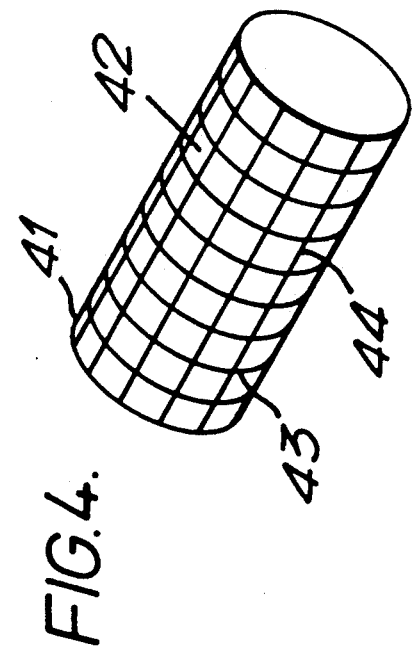

FIG. 4 represents the upper roller (41) of a pair of cutting rollers, whose surface is provided with alveoli (42) whose cutting edges (43,44) are so positioned that the alveoli form rows in both longitudinal and transversal directions, for cutting the strands into flakes in one cutting operation.

Figure 5:
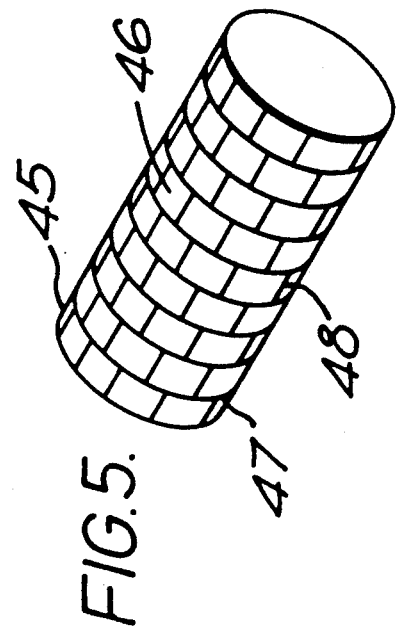
FIGS. 4 and 5 represent perspective views of cutting rollers the surfaces of which have a cutting profile shaped to cut the strands both transversely and longitudinally into the desired shape.

FIG. 5 also represents the upper roller (45) of a pair of cutting rollers whose surface is provided with alveoli (46) with cutting edges (47,48) whereby the cutting edges (48) are offset relative to the cutting edges (47) of laterally adjacent alveoli.

EXAMPLES

In operation, a premix was made from the following ingredients:

| | |
|---|---|
| Rice flour | 58.7% |
| Milk powder 26% | 11.8% |
| Cocoa powder | 4.5% |
| Sugar | 12.0% |
| Malt extract | 13.0% |

Referring to FIGS. 1 and 2 this premix was fed to the hopper (10) and 0.8% syrup of malt was added. The premix was fed to the extruder-cooker (11) through an adjustable screw feeder at the base of the hopper at a flow rate of 300 kg/hr. and the appropriate amount of water was added directly into the extruder-cooker (11). The mixture in the extruder-cooker became thermoplastic under the influence of the temperature and pressure and was extruded through the orifices (15,16) as two strands (17) which expand and puff immediately upon extrusion into the atmosphere.

At the start-up of the process, an operator takes the strands which are extruded at 20 m/min. and ensures that they travel side by side through the nip between stretching rollers (18,19) rotating at such a speed that the speed of the strands is increased to 30 m/min. so that the strands are stretched to achieve a density of 110 g/liter to give the desirable flaky, crumbly texture, then through the nip between the first pair of cutting rollers (20,21) for longitudinal cutting by the edges of grooves (22) and then through the nip between the second pair of cutting rollers (23,24) for transversal cutting by means of cogs (25) to give flakes (26). For cutting through the flakes, the shafts of the upper rollers (20) and (23) are pressed down with a force of 120 kg/cm by means of a hydraulic piston (not shown).

Once the dough strands have been initially guided through the nip of the rollers (18,19), they continue to travel automatically from the extruder. The moisture content of the flakes cut by the rollers (23,24) is 7–8%. The flakes fall onto the conveyor (28) where they are transported through the electric oven (27) for 4 minutes, the oven temperature being 130° C. After leaving the oven, the flakes pass to the fluidised bed (29) and then to the collecting container (30). The final moisture content of the flakes is 2–3%.

In the embodiment shown in FIG. 3, the strands (32) which are extruded at 15 m/min. are passed through the nip between stretching rollers (33,34) rotating at such a speed that the speed of the strands is doubled thus stretching the strands to achieve a density of 120 g/liter. The strands then pass through the nip of synchronising rollers (35,36) and then through the nip between cutting rollers (37,38) for transverse cutting to give flakes (40) which are approximately square having sides about 15 mm long.

The synchronising rollers (35,36) ensure that the cutting rollers (37,38) rotate 10% faster than the stretching rollers (33,34) to compensate for the elongation produced by the small amount of compression of the strands as they pass between the stretching rollers, thus preventing the formation of waves in the strands.

The flakes are then roasted in a similar manner to that described and illustrated in FIGS. 1 and 2.

In the embodiment shown in FIG. 4, a similar process is carried out to that described in FIGS. 1 and 2 except that only one pair of cutting rollers is used to punch or stamp the strand into flakes instead of two pairs.

In the embodiment shown in FIG. 5, a similar process is carried out to that described in FIGS. 1 and 2 except that only one pair of cutting rollers is used to punch or stamp the strand into flakes and, in addition, the stretching rollers are eliminated. This is because the upper roller (45) has alveoli (46) with cutting edges (48) which are offset so that when a part of a strand is punched or stamped transversely the adjacent part is stretched. In this case, one or more supporting rollers may be present to support the strand between the extruder and the cutting rollers.

In the embodiments illustrated in FIGS. 4 and 5 the internal corners of the alveoli 42,46 may be curved concavely so that the cut flakes have convex shaped corners.

We claim:

1. A process for the preparation of cereal flakes comprising extrusion-cooking a dough in an extruder-cooker, extruding the cooked dough from the cooker through a rectangularly shaped orifice to form an expanded and puffed extruded dough, stretching the extruded dough to obtain a stretched dough having a density of from 75 g/liter to 200 g/liter, cutting the stretched dough into flakes and then roasting the flakes.

2. A process according to claim 1 wherein the orifice has a width of from 0.1 mm to 1 mm and a length of from 5 mm to 100 mm.

3. A process according to claim 1 wherein the orifice has a width of from 0.25 mm to 0.75 mm and a length of from 10 mm to 100 mm.

4. A process according to claim 1 further comprising introducing steam into the cooker to aid cooking of the dough.

5. A process according to claim 1 wherein water is added to a premix in an amount of less than 5% by weight to prepare the extrusion cooked dough.

6. A process according to claim 1 wherein the flakes to be roasted have a moisture content of from 5% to 10% by weight.

7. A process according to claim 2 wherein water is added to a premix in an amount of less than 5% by weight to prepare the extrusion cooked dough.

8. A process according to claim 7 further comprising introducing steam into the cooker to aid cooking of the dough.

9. A process according to claim 8 wherein the flakes to be roasted have a moisture content of from 5% to 10% by weight.

10. A process according to claim 1 wherein the stretched dough has a density of from 80 g/liter to 160 g/liter.

11. A process according to claim 1 wherein the extruded dough is stretched by increasing the speed of the extruded dough by from 1.2 to 2-fold.

12. A process according to claim 1 wherein the extrusion cooked dough is extruded at a speed of from 10 meters/min. to 25 meters/min. and is stretched by being transported to a cutting means at an increased speed of from 15 meters/min to 50 meters per min.

13. A process according to claim 1 wherein the extruded dough is stretched by passing the extruded dough through a nip between a pair of rollers which exert a traction on the extruded dough and rotate at a speed which increases the speed of the extruded dough to a speed greater than that at which the dough is extruded.

14. A process according to claim 13 wherein at least one roller has cutting means to cut the stretched dough.

15. A process according to claim 14 further comprising cooling the rollers to a temperature to prevent sticking of the flakes to the rollers.

16. A process according to claim 1 wherein the stretched dough is cut by passing the stretched dough through a nip between a pair of rollers wherein at least one roller has cutting means.

17. A process according to claim 16 further comprising cooling the rollers to a temperature to prevent sticking of the flakes to the rollers.

18. A process according to claim 1 wherein the flakes are roasted to a moisture content of from 1% to 4%.

* * * * *

UNITED STATES PATENT AND TRADEMARK OFFICE
CERTIFICATE OF CORRECTION

PATENT NO.  : 5,143,740
DATED       : September 1, 1992
INVENTOR(S) : Claude BLANCHARD, et al.

It is certified that error appears in the above-identified patent and that said Letters Patent is hereby corrected as shown below:

Column 1, line 33, "rectangular" should be --rectangularly--.

Column 1, line 48, delete "thin flat, slit-like" and insert therefor --rectangularly shaped--, and after "orifice", insert --contained in an extruder exit nozzle--.

Column 2, line 11, "extruder, e.g., exit nozzle," should be --extruder exit nozzle, e.g.,--.

Column 3, line 24, after "60°" insert --C--.

Signed and Sealed this

Thirty-first Day of August, 1993

Attest:

BRUCE LEHMAN

Attesting Officer    Commissioner of Patents and Trademarks